(12) United States Patent
Bose et al.

(10) Patent No.: US 9,786,407 B1
(45) Date of Patent: Oct. 10, 2017

(54) HIGHLY CONDUCTIVE GRAPHENE-BASED POLYMER COMPOSITE

(71) Applicant: Rhode Island Board of Education, State of Rhode Island and Providence Plantations, Providence, RI (US)

(72) Inventors: Arjit Bose, Lexington, MA (US); Indrani Chakraborty, Kingston, RI (US)

(73) Assignee: Council on Postsecondary Education, Warwick, RI (US)

( * ) Notice: Subject to any disclaimer, the term of this patent is extended or adjusted under 35 U.S.C. 154(b) by 43 days.

(21) Appl. No.: 14/847,813

(22) Filed: Sep. 8, 2015

Related U.S. Application Data (60) Provisional application No. 62/046,257, filed on Sep. 5, 2014.

(51) Int. Cl.
| | | |
|---|---|---|
| *C01B 31/00* | (2006.01) | |
| *C08K 3/02* | (2006.01) | |
| *H01B 1/24* | (2006.01) | |
| *B29C 43/00* | (2006.01) | |
| *B29B 9/12* | (2006.01) | |
| *B29K 25/00* | (2006.01) | |
| *B29K 105/16* | (2006.01) | |
| *B29K 509/00* | (2006.01) | |
| *B29K 409/00* | (2006.01) | |
| *B29K 507/04* | (2006.01) | |

(52) U.S. Cl.
CPC .............. *H01B 1/24* (2013.01); *B29B 9/12* (2013.01); *B29C 43/003* (2013.01); *B29K 2025/06* (2013.01); *B29K 2105/16* (2013.01); *B29K 2409/00* (2013.01); *B29K 2507/04* (2013.01); *B29K 2509/00* (2013.01); *B29K 2995/0005* (2013.01)

(58) Field of Classification Search
CPC ................................ C08K 3/02; C01B 31/00
USPC ...... 252/500, 502, 510, 511; 423/445 B, 448, 423/460; 977/897
See application file for complete search history.

(56) References Cited

U.S. PATENT DOCUMENTS

| | | | |
|---|---|---|---|
| 2007/0131915 A1* | 6/2007 | Stankovich | ......... C01B 31/0423 252/511 |
| 2010/0096595 A1* | 4/2010 | Prud'Homme | ........ B82Y 30/00 252/500 |
| 2011/0260116 A1* | 10/2011 | Plee | ....................... B82Y 30/00 252/511 |

OTHER PUBLICATIONS

Qi ("Enhanced Electrical Conductivity in Polystyrene Nanocomposites at Ultra-Low Graphene Content." ACS Appl Mater & Inter, 3, 3130-3133, pub Jul. 2011).*

* cited by examiner

*Primary Examiner* — Tri V Nguyen
(74) *Attorney, Agent, or Firm* — Gesmer Updegrove LLP (57) ABSTRACT

A method was developed to impart a significant enhancement in the electrical conductivity of a graphene/polymer composite by the addition of a non-conducting filler to the insulating polymer that acts as both a toughening agent and dispersion aid.

9 Claims, 6 Drawing Sheets

HIGHLY CONDUCTIVE GRAPHENE-BASED POLYMER COMPOSITE

PRIORITY

The present application claims priority to U.S. Provisional Patent Application Ser. No. 62/046,257 filed Sep. 5, 2014, the entire disclosure of which is hereby incorporated by reference.

BACKGROUND

The present invention generally relates to graphene-based polymer composites, and relates in particular to electrical conductivity enhancement of graphene-based polymer composites using a non-conductive filler.

Defect-free single layer graphene sheets consist of single atom thick sp2 bonded hexagonally arranged carbon atoms. These sheets display remarkable properties including exceptional in-plane electrical and thermal conductivity, high stiffness and tensile strength, optical transparency, negligible permeability to gases, and van der Waals transparency. The scientific and commercial interest in graphene is not restricted to the pristine monolayer, but includes related 2D materials that include few-layer graphene, multilayer graphene, graphene nanoplates, ultrathin 3D crystalline flakes with thickness <100 nm, and chemically modified forms such as graphene oxide. The essentially 2-dimensional nature of these materials along with their excellent properties makes them important as fillers, imparting useful functionalities into matrices. Polymers that display high conductivity have a variety of uses ranging from bulk applications such as anti-static mats and fuel lines, to specialty applications such as radiation shields, sensors and electrodes for batteries. While single layer graphene remains expensive and more suited for high end uses in electronic devices, opto-electronics, and supercapacitors, the electrical conductivity of the much lower cost graphene nanoplates (GNP)s is adequate for applications where a polymer must exhibit electrical conductivity. Graphene nanoplates have exceptional electrical, thermal, mechanical and barrier properties. Typical GNPs are several microns in lateral dimensions and consist of 8-10 layers of carbon atoms, providing aspect ratios (ratio of the lateral dimension to thickness) of the order of $10^3$-$10^4$.

To achieve usable levels of electrical conductivity in an insulating material, a conducting filler must be loaded to a volume fraction beyond a percolation threshold. Graphene nanoplates are essentially two-dimensional structures. If allowed to rotate freely in a matrix, the 'volume' swept by it is that of a sphere of diameter corresponding to the lateral dimensions of the graphene nanoplates sheets, giving a theoretical volume loading at percolation that is well below that of spheres. If graphene nanoplates sheets are modeled as disks of aspect ratio (AR=disk diameter/thickness), the percolation threshold $\phi_c$, under these conditions, is given by $$\phi_c = 1.5 \, \phi_{sphere}/AR. \quad (1)$$

In Equation (1), $\phi_{sphere}$ is the percolation threshold for spheres, i.e., $\phi_{sphere}=0.29$ $\phi_{sphere}=0.29$ is for monodispersed spheres; that number is lower if there is polydispersity, but remains of the same order of magnitude). Since aspect ratio can take on values of the order of $10^4$ for graphene nanoplates, the advantage of using these high aspect ratio conducting particles in lowering the volume loading at percolation becomes apparent compared to most common fillers that have aspect ratios close to 1. Providing such a low loading at percolation also has a significant benefit for mechanical properties, particularly under impact conditions, as filler materials can act as nucleation sites for crack growth, as well as lower material cost. GNP is now used as a filler material in polymer composites for various applications ranging from antistatic plastics, electrodes for batteries, electromagnetic interference (EMI) shields, field effect transistors (FET), solar cells, photovoltaics and various weight-sensitive aerospace and automotive applications.

While the volume loading at percolation is small for sheet like materials, van der Waals attraction between these sheets cause rapid agglomeration and dispersing these sheets in a polymer remains a major challenge. Also, interfacial incompatibility between graphene and polymers results in a large drop in the flexural strength and toughness of the composite compared to the native polymer.

There remains a need, therefore, for a resilient graphene-based polymer composite having low graphene loading while providing high electrical conductivity.

SUMMARY

In accordance with an embodiment, the invention provides a method of making an electrically conductive composite material, comprising dissolving a polymer in a solvent, making a suspension comprising the dissolved polymer and a non-conductive filler, making a suspension comprising individual graphene units, mixing the two suspensions together, adding an antisolvent for the polymer to the mixed suspension to precipitate a composite material, drying the composite material; and pressing the composite material to remove air and produce a desired shape. In a further embodiment, the non-conducting filler is present in the range of 5-10 volume percent, and the graphene units are present in the range of 1.5-2.5 volume percent.

In accordance with a further embodiment, the invention provides a composition of matter comprising graphene particles, one or more non-conductive fillers and, a polymer, wherein the one or more non-conductive fillers are mixed with the graphene particles within the polymer such that the non-conductive fillers inhibit agglomeration of the graphene particles suspended in the polymer.

BRIEF DESCRIPTION OF THE DRAWINGS

The following description may be further understood with reference to the accompanying drawings in which.

The drawings are shown for illustrative purposes only.

DETAILED DESCRIPTION

Applicants have discovered that the addition of a non-conductive filler to a composite of graphene and polymer prevents agglomeration of the graphene units during processing. In addition, when the non-conductive filler is dispersed homogeneously throughout a polymer solution, the filler would disperse the graphene units into a more random orientation in the polymer, enhancing percolation at low loadings. This increased dispersion within the polymer due to the filler creates a composite that has dramatically higher electrical conductivity than one without.

Figure 1:
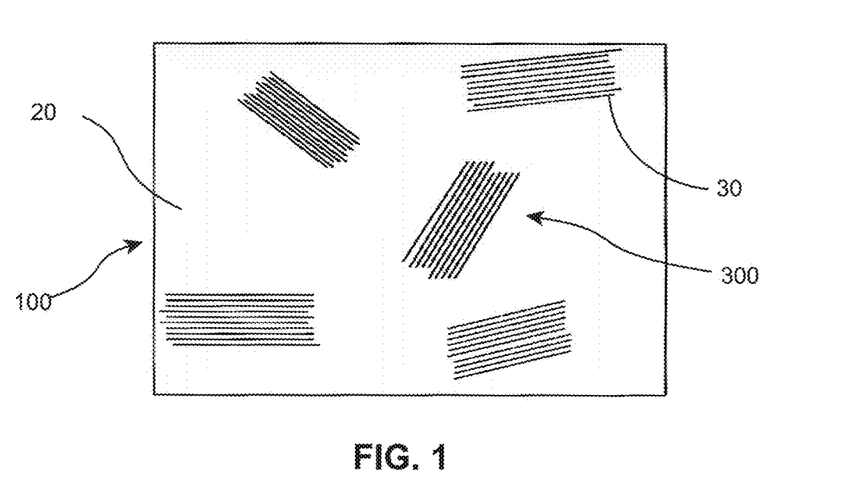
FIG. 1 shows an illustrative view of a graphene-based polymer composite with agglomerated graphene.

FIG. 1 illustrates an issue with mixing graphene into a polymer, where composite 100 includes a polymer 20 and graphene nanoplates (GNP) 30. Van der Waals attraction between individual GNP 30 cause rapid agglomeration into GNP clusters 300. Because the clusters isolate individual GNP 30, a higher concentration of GNP 30 is needed to exceed a percolation threshold within the composite 100 such that the composite achieves a desired level of electrical conductivity. Because GNP is fairly expensive, reducing the amount of GNP needed to achieve a desired electrical conductivity is desirable.

Figure 2:
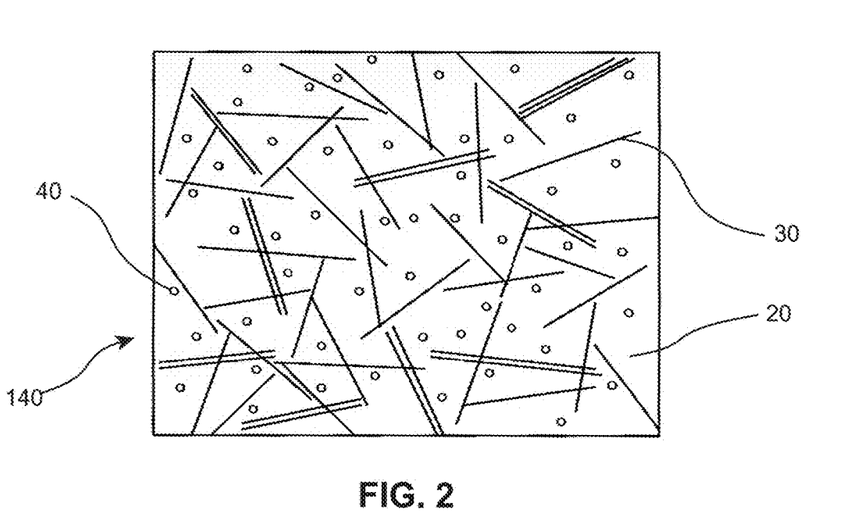
FIG. 2 shows an illustrative view of a graphene-based polymer composite with graphene dispersed by a non-conductive filler in accordance with an embodiment of the invention.

FIG. 2 illustrates another composite 140 utilizing a non-conductive filler 40 to separate individual GNP 30, dispersing the GNP 30 more evenly within the polymer 20. A more even distribution of the conductive GNP allows for a lower GNP concentration to produce a conductive framework within the polymer, dramatically increasing the electrical conductivity of the composite.

Figure 3A:
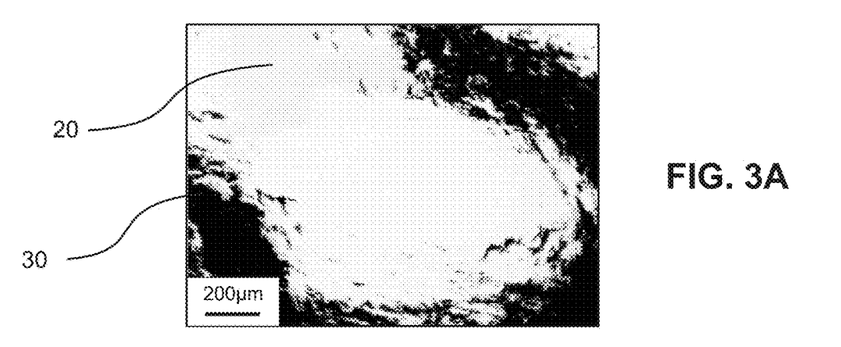
FIGS. 3A-3D show backscattered SEM images illustrating the distribution of graphene in polystyrene matrix for various concentrations of non-conductive filler.
Figure 3B:
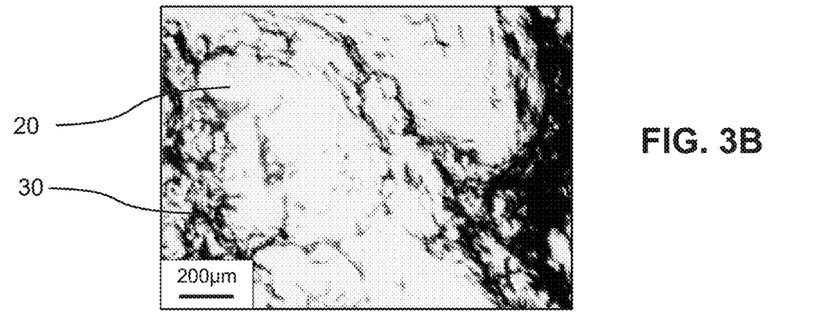
Figure 3C:
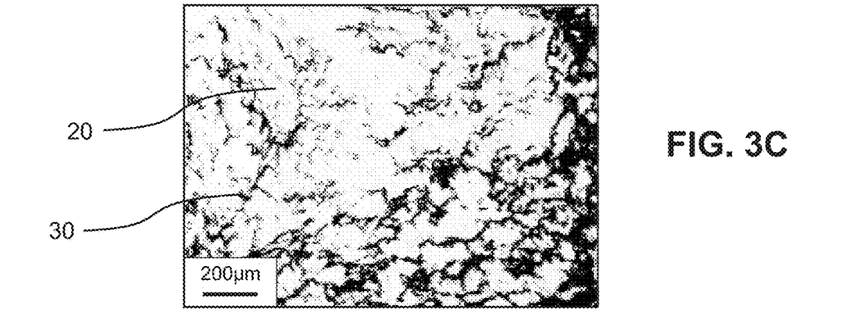
Figure 3D:
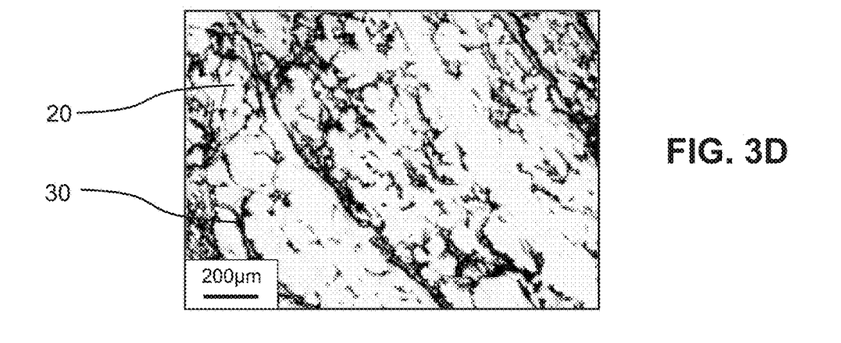

To evaluate the effect of adding the non-conductive filler 40 to the graphene/polymer composites 100/140, composite samples at various concentrations were examined using a scanning electron microscopy (SEM) and complementing those results with X-ray diffraction. In one embodiment, silica was selected for the non-conductive filler, graphene nanoplates were used for the graphene unit, and polystyrene (PS) was chosen for the polymer. FIG. 3A is a back-scattered SEM image of the sample with no silica. The graphene nanoplates 30 were demonstrated to be agglomerated rather than being dispersed in the PS 20, and the conductivity was measured at $10^{-9}$ S/m. In contrast, at 2.5 volumetric percentage (vol %) silica as shown in FIG. 3B, the conductivity of the composite was found to rise dramatically to $10^{-4}$ S/m. Electron microscopy analysis of samples showed remarkably improved dispersion of the graphene nanoplates at this silica concentration. As the silica loading was increased to 12 vol %, the conductivity rose further to 1 S/m, and the graphene nanoplates sheets were even more uniformly dispersed throughout the sample, as shown in FIG. 3C. Beyond 12 vol % silica loading, there was a rapid, substantial two order decrease in electrical conductivity of the composite that leveled off up to 40 vol % loading of silica. Referring to FIG. 3D, it was observed that the levels of excessive silica particles at these concentrations starts to disrupt the connectivity of the graphene nanoplates network at 20 vol % silica.

Figure 4:
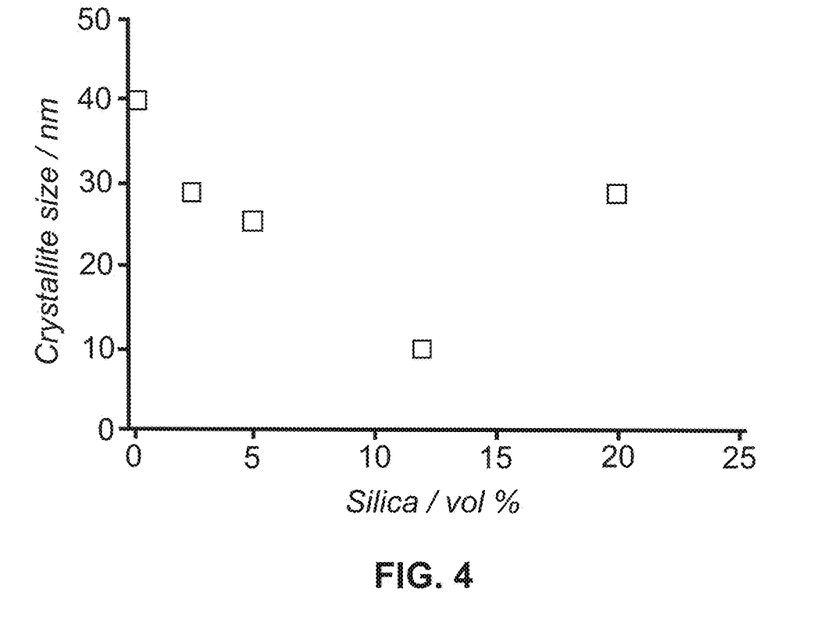
FIG. 4 is a plot of graphene crystallite size in a graphene-based polymer composite as a function of silica concentration.

The connectivity of the graphene within the composite was determined using X-ray data focusing around the graphite peaks, which was used to measure the full width at half maximum. Subsequently, Scherrer's analysis was performed to determine an average crystallite size for the graphene nanoplates that was graphed versus silica concentration in FIG. 4. It was found that the average crystallite size decreased as the silica loading increased to 12 vol % after which the size rose as the silica concentration increased to 20 vol %. This observation showed that improved dispersion of the graphene nanoplates at concentrations up to 12 vol % silica, followed by greater graphene nanoplates agglomeration as the silica content was increased further.

Figure 5:
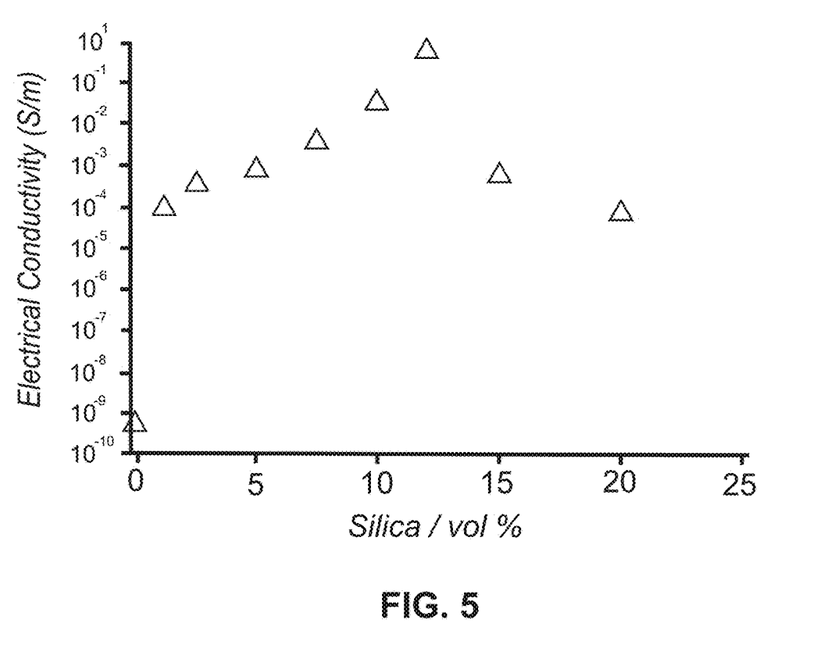
FIG. 5 is a plot of electrical conductivity of a graphene-based polymer composite as a function of silica concentration.

Electrical conductivity measurements for various silica concentrations is shown in FIG. 5, and substantially mirrors the results of the graphene crystallite size for various silica concentrations. As seen in FIG. 5, electrical conductivity of the composites increases by several orders of magnitude, and peaks at 12 vol % silica.

In another embodiment of the invention, a different non-conductive filler, Core-shell rubber (CSR) particles are used to disperse the graphene units 30 within the polymer 20. CSR comprises a core composed of polybutadiene (PB) and a shell made of a methylmethacrylate/styrene/acrylate copolymer. The size of the CSR particles varies between 100-150 nm with a shell thickness of 4 nm.

Figure 6:
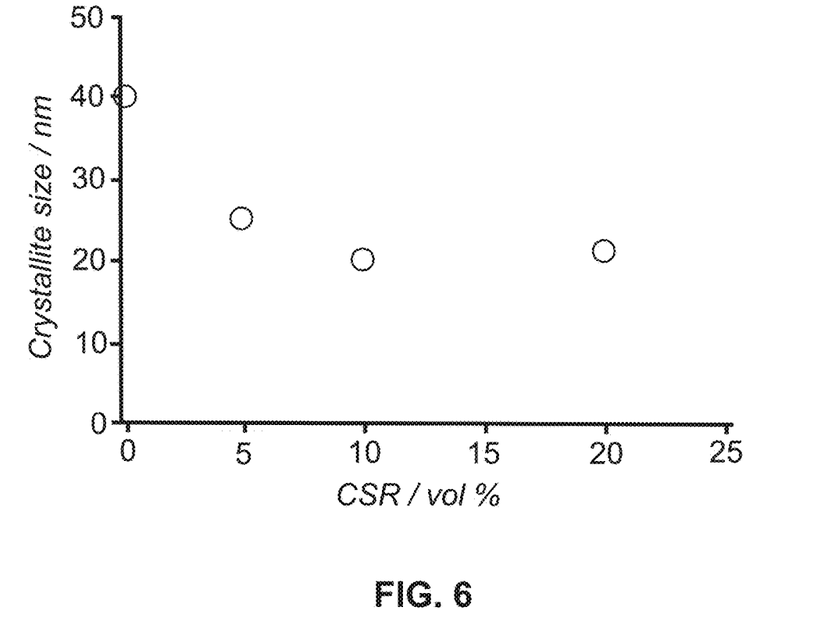
FIG. 6 is a plot of graphene crystallite size in a graphene-based polymer composite as a function of core shell rubbery (CSR) nanoparticle concentration.

FIG. 6 shows wide-angle X-Ray diffraction data from the CSR-GNP-PS composites. Using the measured full width at half maximum for each CSR loading, Scherrer's equation is used to calculate the size of the GNP crystallites. FIG. 6 shows that the crystallite size decreases with increasing CSR loading, confirming less restacking of the GNP sheets in the PS.

Figure 7:
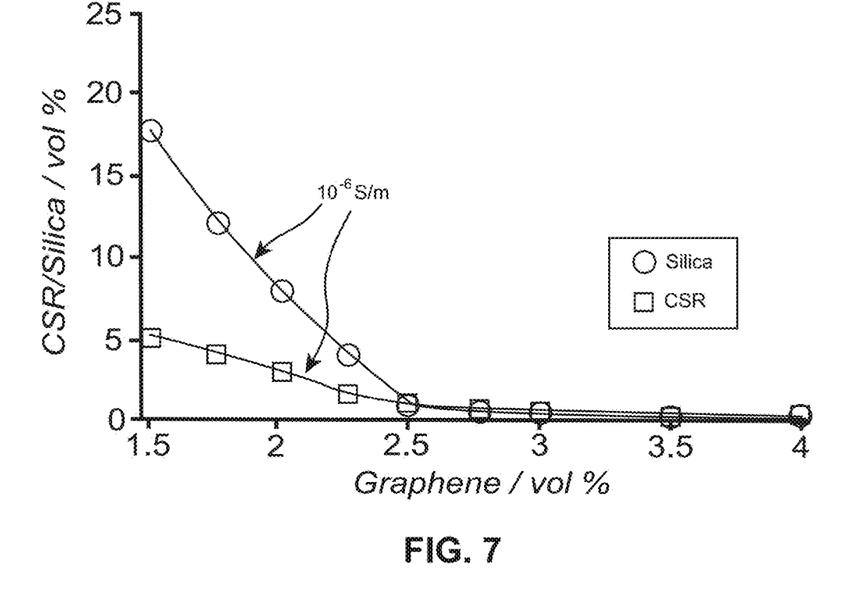
FIG. 7 is a plot of silica (triangles) and CSR (squares) loading as a function of graphene loading for a given electrical conductivity threshold.

Referring to FIG. 7, the concentration of CSR and silica were plotted versus the concentration of graphene. It was determined that a conductivity threshold value of 10-6 S/m was applicable for determining if a sample was conducting. As seen in FIG. 7, the CSR particles enhance the electrical conductivity beyond that of the silica nanoparticles at equal graphene volume loadings. The shell of the CSR particles is compatible with the PS, suppressing agglomeration and allowing them to disperse better than the silica particles. This, in turn, keeps the GNP dispersed better, and prevents agglomeration more efficiently. The percolation threshold for GNP with CSR is therefore lower than that for GNP with silica.

Figure 8:
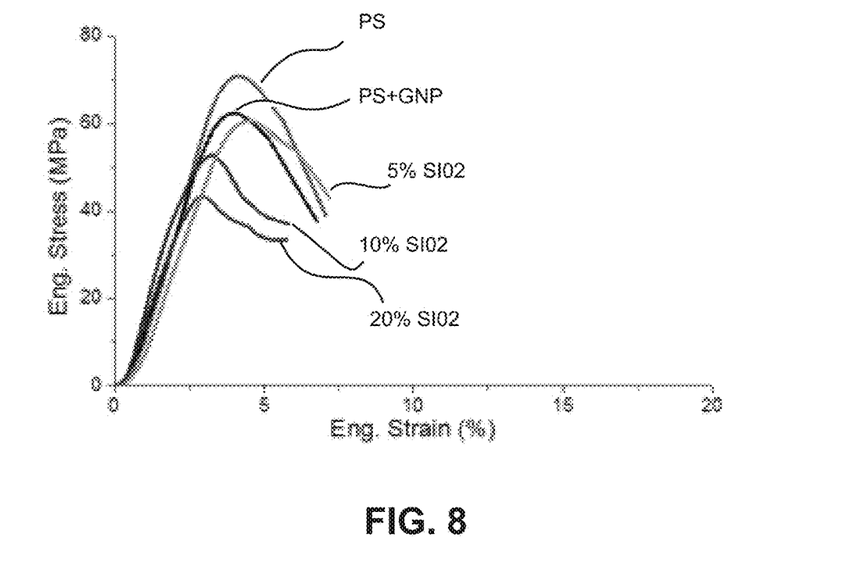
FIG. 8 is an engineering stress-strain curve for polystyrene (PS), PS and graphene nanoplates (GNP), and GNP/silica/PS composites.
Figure 9:
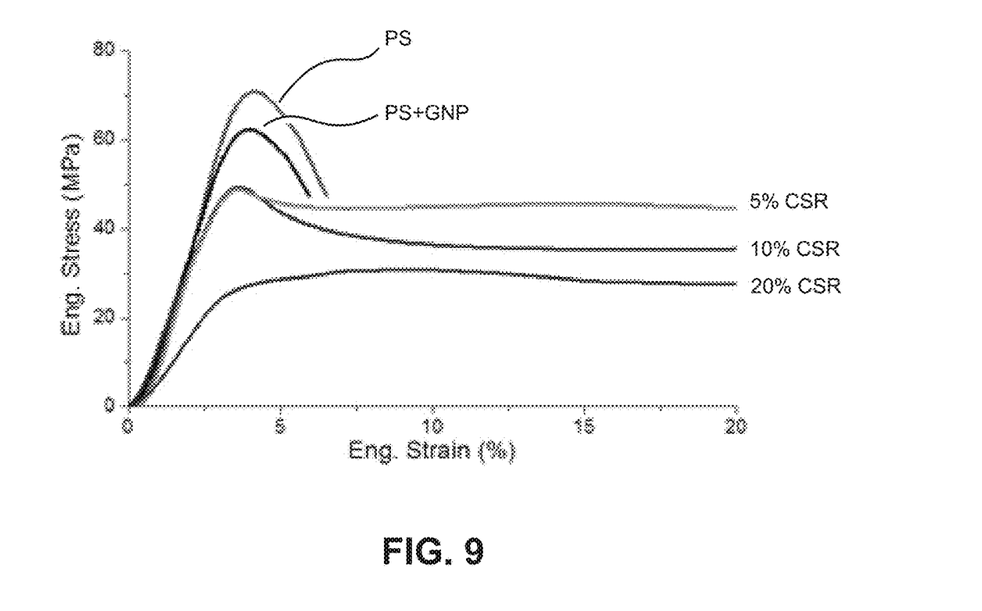
FIG. 9 is an engineering stress-strain curve for polystyrene (PS), PS and graphene nanoplates (GNP), and GNP/CSR/PS composites.

FIGS. 8 and 9 show the compressive stress-strain behavior of GNP/silica/PS and GNP/CSR/PS composites, respectively. The silica-containing composites fail under compression as shown in FIG. 8. Incorporating a filler such as GNP alone or GNP with silica reduces the maximum compressive strength compared to the native polystyrene. In contrast, as seen in FIG. 9, GNP/CSR/PS composites do not fail under the compressive loading, indicating a large increase in their toughness.

Figure 10:
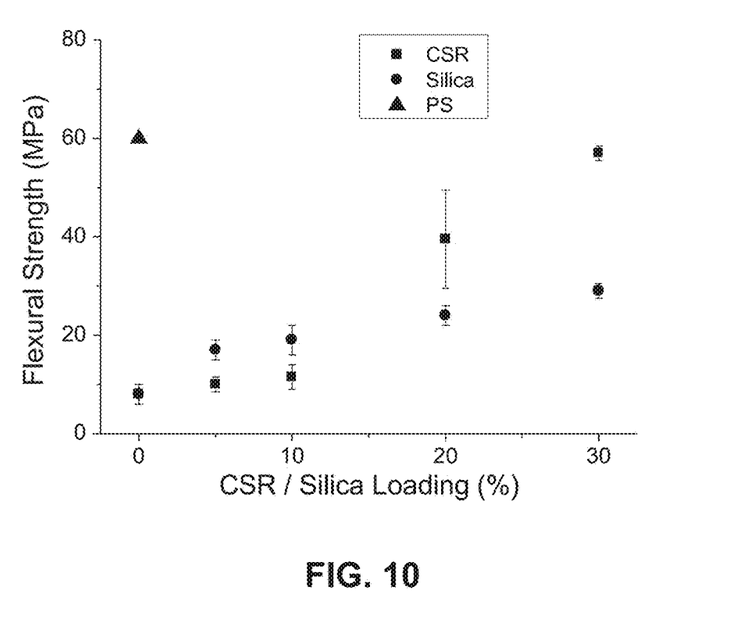
FIG. 10 is a plot of flexural test results of the GNP/CSR/PS and the GNP/silica/PS composites.

Results from three-point flexural tests on the composites are shown in FIG. 10. At low volume loadings, the CSR and silica bearing composites show similar flexural strength. However, beyond 10% loading, the CSR composites show a higher flexural strength, eventually matching the value of pure PS. Aggregation of silica particles at high loadings produces defects and weak spots, which attenuates the flexural strength. The CSR is well-distributed even at high loadings. The rubbery PIB in the CSR particles increases the ductility of the composites and the sample is able to extend significantly without breaking. We note that the shell on the CSR only acts as a compatibilizing surface, and does not add any mechanical properties to the matrix.

Incorporating CSR into a PS matrix containing GNP allows fabrication of a composite that is electrically conducting with comparatively high toughness and flexural strength. The compatibility of the CSR shell with PS and the presence of PB as the core help the CSR particles disperse within the PS solution, which helps prevent restacking of GNP to enhance electrical conductivity, as well as improving toughness and flexural strength of the composites.

Figure 11:
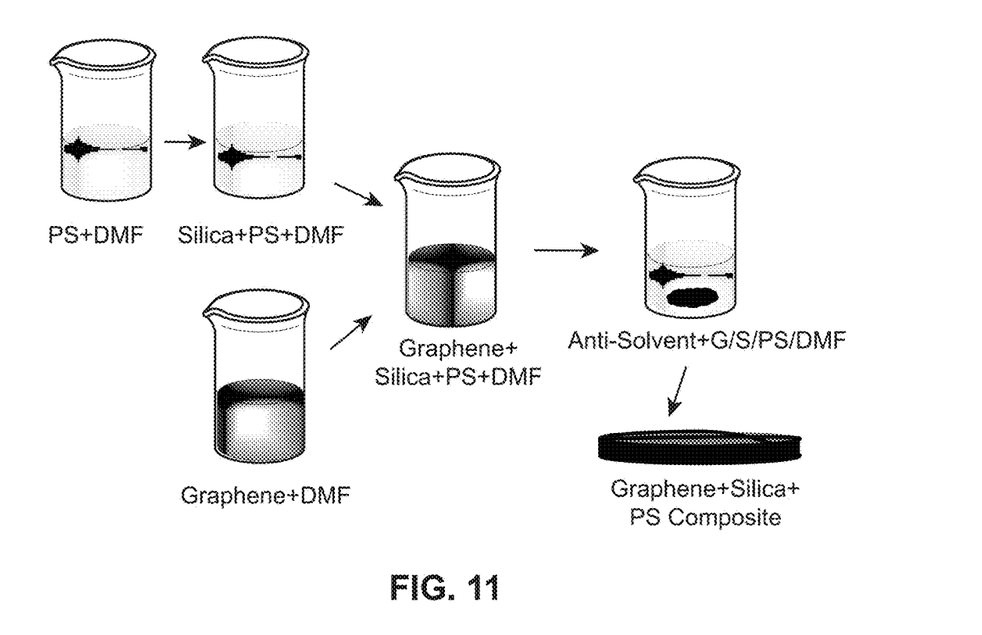
FIG. 11 is an illustration of a method of producing a GNP/silica/PS composite.

FIG. 11 shows an example procedure for forming a graphene polymer composite according to one embodiment of the present invention. 200 nm diameter spherical silica particles are added to 2.5 vol % of graphene nanoplates-containing polystyrene as follows. Seven grams of the polystyrene pellets are dissolved in 42 ml of N,N-dimethylformamide (DMF) and the solution is stirred magnetically for 12 hours. The silica particles are added next and the mixture sonicated for 1.5 hours to disperse the silica. GNP at a concentration of 0.001 gm/ml is dispersed in DMF and sonicated for 1.5 hours to disperse the GNP. Both particle-containing suspensions are then mixed in a 1:1 ratio and magnetically stirred for 2 hours. This mixed suspension is then poured into methanol, an antisolvent for polystyrene. The polystyrene precipitates rapidly, creating the composite. The excess methanol is withdrawn, and the composite is dried in an oven for 18 hours at 90° C. The sample is hot pressed at 120° C. to remove of all entrapped air bubbles, and to create a sample with a disk-like shape that is amenable for electrical conductivity measurements. All reported loadings are based upon the volume percent in the final composite.

In another example, mixing of non-conductive particles and graphene in their respective solutions can be accomplished by blending, using an agitation chamber, a shake table, or any other known method to mix The surfaces of specimens are coated with silver paint to reduce contact resistance. A standard two-point probe using a constant current source (Keithley Instruments Model 6221) is used to obtain bulk volumetric electrical conductivity. The voltage drop across the specimen is recorded, and the resistance of the sample calculated from this measurement. This is normalized with the dimensions of the sample to produce the electrical conductivity. The surface morphology of the composites is observed using scanning electron microscopy (Zeiss SIGMA VP FE-SEM) in backscatter mode. A Rigaku Ultima IV diffractometer with Cu Kα radiation is used for the X-ray diffraction (XRD) measurements. For evaluation of the quasi-static compression properties, cylinders of diameter 1 cm and height 3 cm are molded. For flexural strength evaluation using the three-point bend test, rectangular pieces of dimensions 4 cm×1 cm×0.4 cm are formed. All loadings reported in the results section are based upon the volume percent in the final composite. The compressive and flexural strengths of the samples are measured using an Instron Universal Testing Machine (Model 5585).

The graphene units used herein can be any suitable graphene product that is easily dispersed within a polymer, and can include any related 2D materials that include few-layer graphene, multilayer graphene, graphene nanoplates (also referred to as nanoplatelets), ultrathin 3D crystalline flakes with thickness <100 nm, and chemically modified forms such as graphene oxide.

Graphene nanoplates can be purchased from XG Sciences, USA. The lateral dimensions of these nanoplates is 25 µm and thickness is approximately 6 nm. 200 nm silica nanoparticles can be purchased from Nyacol, USA. Core-shell rubber particles can be obtained from Dow Chemical, USA. Polystyrene (MW 121,000) pellets can be purchased from Styrolution, USA. N,N-dimethylformamide (DMF) and methanol can be purchased from Fisher Scientific, USA. The 200 nm silica particles and 100-150 nm CSR particles are used as examples, however there is a range of similar materials and sizes of fillers that can be utilized to impart desirable conductive and structural properties to a composite. In some embodiments, a method was developed to impart a significant enhancement in the electrical conductivity of a graphene nanoplates/polystyrene composite by the addition of a plurality of non-conducting fillers to the insulating polymer.

Those skilled in the art will appreciate that numerous modifications and variations may be made to the above disclosed embodiments without departing from the spirit and scope of the present invention.

What is claimed is:

1. A method of making an electrically conductive composite material, comprising:
   dissolving a polymer in a solvent;
   making a suspension comprising the dissolved polymer and a non-conductive filler dispersing-aid;
   making a suspension comprising individual graphene units;
   mixing the two suspensions together;
   adding an antisolvent for the polymer to the mixed suspension to precipitate a composite material;
   drying the composite material; and
   pressing the composite material to remove air and produce a desired shape,
   wherein the non-conductive filler dispersing-aid comprises silica or a core-shell rubber and
   wherein the non-conducting filler dispersing-aid is present in the range of 5-10 volume percent, and the graphene units are present in the range of 1.5-2.5 volume percent.

2. The method of claim 1, wherein the polymer is polystyrene.

3. The method of claim 2, wherein the solvent is N,N-dimethylformamide.

4. The method of claim 2, wherein the antisolvent is methanol.

5. The method of claim 1, wherein the graphene units comprise graphene nanoplates.

6. The method of claim 1, wherein the core-shell rubber has a rubber core and polymer shell.

7. The composition of matter of claim 6, wherein the rubber is polybutadiene.

8. The composition of matter of claim 6, wherein the polymer shell is a methylmethacrylate/styrene/acrylate copolymer.

9. The method of claim 1, wherein the steps of making the suspensions include sonicating the suspensions to disperse the non-conductive filler and graphene units within their respective suspensions.

* * * * *

UNITED STATES PATENT AND TRADEMARK OFFICE
CERTIFICATE OF CORRECTION

PATENT NO. : 9,786,407 B1
APPLICATION NO. : 14/847813
DATED : October 10, 2017
INVENTOR(S) : Bose et al.

Page 1 of 1

It is certified that error appears in the above-identified patent and that said Letters Patent is hereby corrected as shown below:

On the Title Page

Correct the first inventor's name as indicated below:
"(72) Inventors: Arijit Bose, Lexington, MA (US)"

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*